United States Patent
Lehtinen

[11] Patent Number: 6,059,156
[45] Date of Patent: May 9, 2000

[54] ATTACHMENT SYSTEM FOR A PORTABLE DEVICE

[76] Inventor: Markku Lehtinen, Lankikatu 4 A 1, Kaarina, Finland, FIN-20780

[21] Appl. No.: 09/155,150

[22] PCT Filed: Mar. 12, 1997

[86] PCT No.: PCT/FI97/00161

§ 371 Date: Sep. 22, 1998

§ 102(e) Date: Sep. 22, 1998

[87] PCT Pub. No.: WO97/36515

PCT Pub. Date: Oct. 9, 1997

[30] Foreign Application Priority Data

Mar. 28, 1996 [FI] Finland .................................. 961405
Oct. 25, 1996 [FI] Finland .................................. 964298

[51] Int. Cl.[7] ............................................... B65D 25/52
[52] U.S. Cl. ..................... 224/197; 224/242; 224/271; 224/272; 224/929; 224/930; 248/225.11
[58] Field of Search ....................................... 224/197, 199, 224/242, 272, 904, 271, 929, 547, 930; 24/663, 668, 590, 597, 3.11, 3.7; 248/222.13, 225.11

[56] References Cited

U.S. PATENT DOCUMENTS

| | | |
|---|---|---|
| 3,743,147 | 7/1973 | Wilczynski . |
| 4,419,794 | 12/1983 | Horton, Jr. et al. . |
| 4,676,420 | 6/1987 | Sharp . |
| 4,718,586 | 1/1988 | Hagino ................................... 224/197 |
| 5,054,170 | 10/1991 | Otrusina .................................... 24/597 |
| 5,597,102 | 1/1997 | Saarikko et al. ......................... 224/197 |
| 5,620,120 | 4/1997 | Tien ......................................... 224/199 |
| 5,622,296 | 4/1997 | Pirhonen et al. ....................... 224/197 |
| 5,850,996 | 12/1998 | Liang .................................. 248/221.11 |

FOREIGN PATENT DOCUMENTS

| | | |
|---|---|---|
| 0 444 377 A1 | 9/1991 | European Pat. Off. . |
| 0 683 587 A1 | 11/1995 | European Pat. Off. . |
| 1 814 427 | 1/1972 | Germany . |
| 2 264 039 | 8/1993 | United Kingdom . |
| 2 276 658 | 10/1994 | United Kingdom . |
| WO 92/13394 | 8/1992 | WIPO . |

*Primary Examiner*—Gregory M. Vidovich
*Assistant Examiner*—Maerena W. Brevard
*Attorney, Agent, or Firm*—Nixon & Vanderhye P.C.

[57] ABSTRACT

An attachment system for temporarily attaching a portable apparatus, such as a mobile phone, to a belt or the like. The system preferably comprises a pocket-shaped apparatus casing (2), a holder (10) connected to a back plate, by means of which the apparatus can be temporarily attached to the casing, fastening members (42, 44), by means of which the casing can be fastened to a belt, the dashboard of a car or the like, and an annular connecting member (36) attached to the portable apparatus, by means of which the apparatus in a given position can be connected to the holder in the back plate by means of a gap (40) formed in the connecting member. The holder (10) is according to a preferred embodiment of the invention attached turnably around its axis to the upper portion of the back plate, and the back plate (6) and the front protecting plate (8) are connected to each other so that there is an opening in the pocket (4) formed between the plates, which allows turning the apparatus as a swivel motion around its connecting member into the pocket or out therefrom.

18 Claims, 5 Drawing Sheets

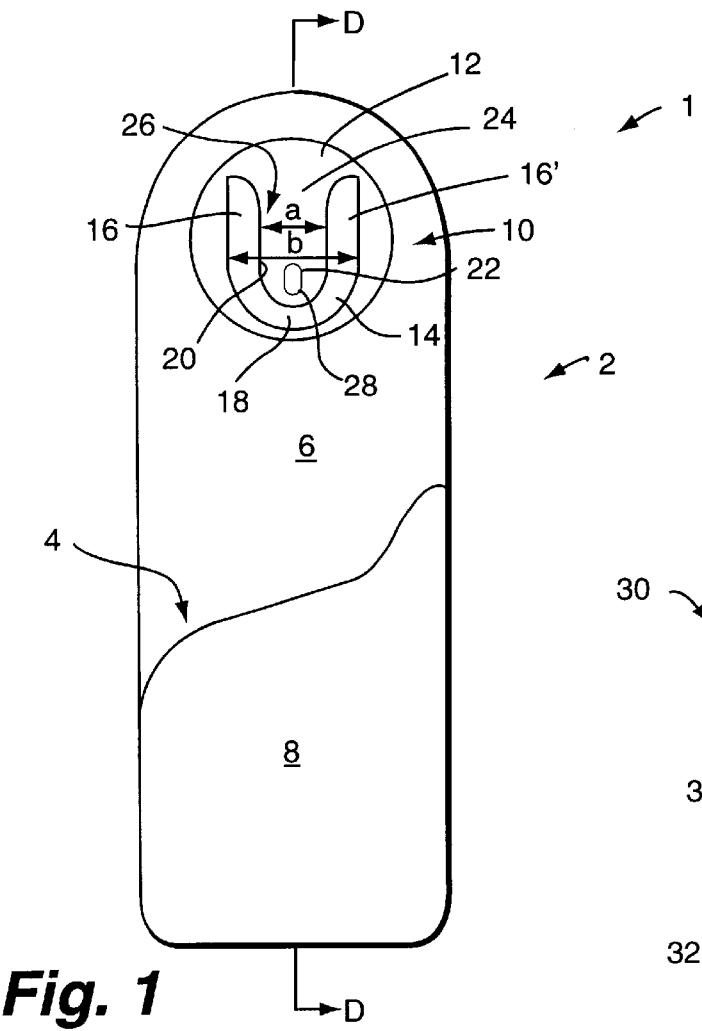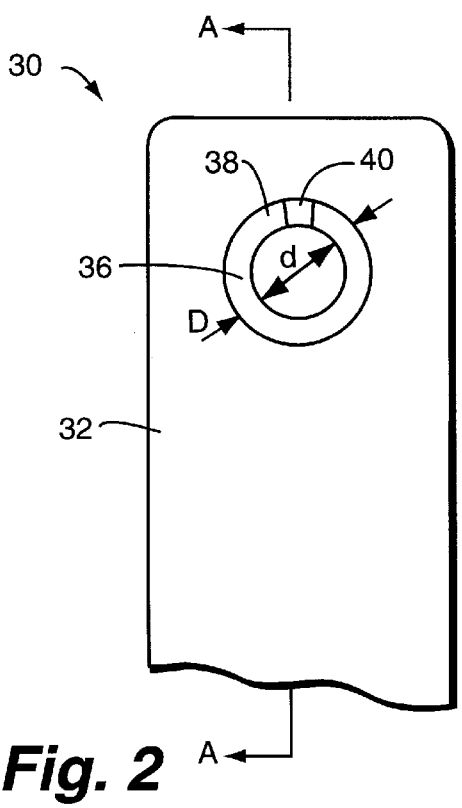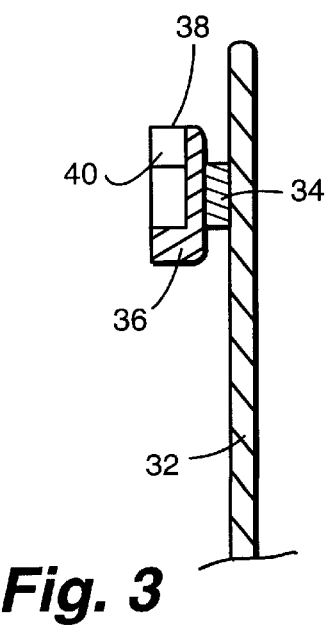
Fig. 1
Fig. 2
Fig. 3

Fig. 9
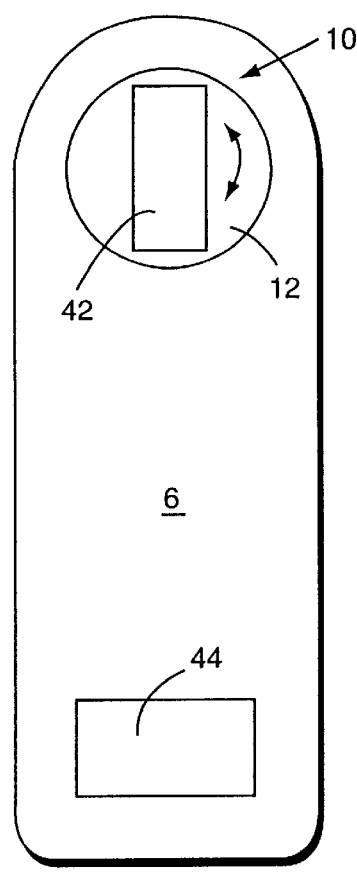
Fig. 10
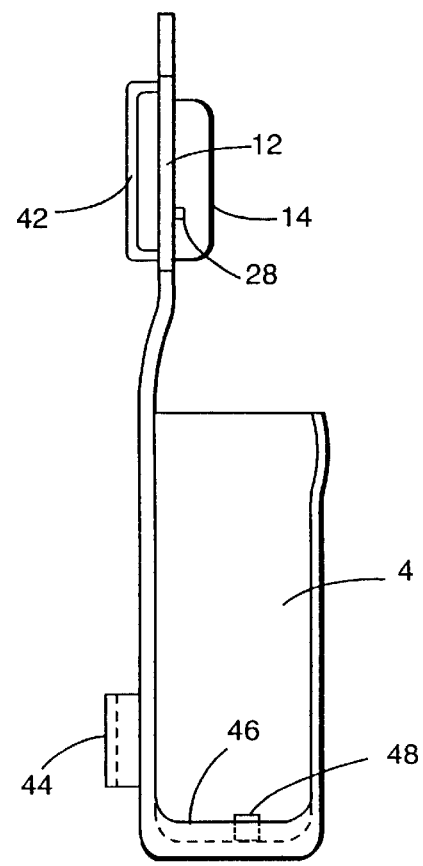
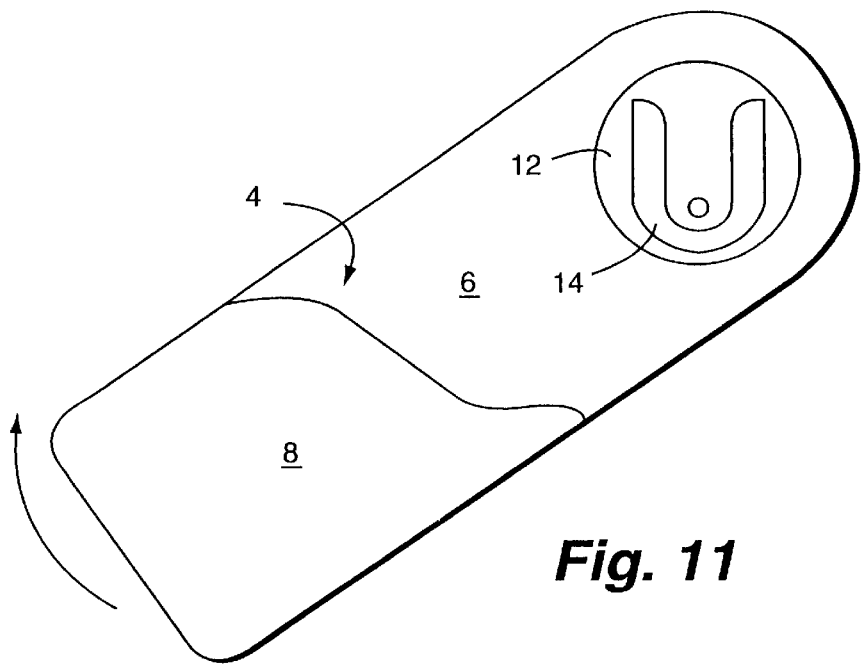
Fig. 11

ATTACHMENT SYSTEM FOR A PORTABLE DEVICE

BACKGROUND AND SUMMARY OF THE INVENTION

The present invention relates to an attachment system for temporarily attaching a portable apparatus, such as a mobile phone, radio or camera, to a belt or the like according to the first part of the following enclosed independent claims.

Known attachment systems of this kind comprise typically a holder which can be fastened to the belt and a connecting member which is attached to the apparatus. This invention relates primarily to systems, in which the holder comprises a base, a front plate connected thereto and a so called locking part, and in which the connecting member attached to the apparatus comprises an annular connecting member or part which protrudes axially outwards from the apparatus.

With the increasing use of portable personal apparatuses, mobile phones in particular, a need has arisen for personal holders by means of which the apparatus can easily be fastened to a belt or other garment or the dashboard of a car, from where it can easily be detached for use, preferably with one hand. Further, the holder should preferably be attachable to a casing or some other kind of protective cover, so that the apparatus can be safely and securely carried around or kept to prevent e.g. an accidental pressing down of the keys of the apparatus. Further, the portable apparatus carried on the belt should be disposable in the holder in a position that is comfortable for the wearer or, preferably, in a position where the apparatus is not felt at all, in other words, is the least in the way.

The problem with the known attachment systems is to obtain a connection between the apparatus and the holder that is reliable enough and, at the same time, comfortable to the wearer. In some known solutions a reliable locking is achieved, but at the cost of a substantially impaired user comfort because of the complexity of the fastening mechanism. Often also the size of the holder is larger than desired.

In some known solutions the flexibility of plastic is utilized in the so called snap-locked systems. The force needed for the unlocking snap has to be rather small, and thus the apparatus may also easily be unintentionally detached from its locking position and fall down, and get damaged or lost. It has also been suggested, e.g. in the Finnish patent application No. 942306, that the mobile phone be fastened to the holder using spring force. With his system the phone can be turned round its fixing point 360° without getting detached. The phone is detached from the holder by pressing down the holder with one hand and at the same time lifting the phone upwards with the other, in other words, both hands are needed to detach the telephone.

In some other known systems, the apparatus itself is provided with a stationary belt holder, in which case both the apparatus and the belt holder must be detached from the belt when the apparatus is being used. Even this fastening system is not necessarily completely reliable, as it is possible for the fastening of the detachable belt holder to the garment to fail. A great disadvantage is furthermore the fact that the apparatus cannot freely turn in the plane of the holder and thus cannot follow the movements of the person wearing the apparatus.

It is the object of the present invention to obtain a better system than the previously known attachment systems. The object is thus to obtain an attachment system which is reliable and easy to use, and in which the apparatus is easily and securely both attached to the holder and detached from it.

Another object is to achieve an attachment system which secures the apparatus to e.g. a belt in the desired position until the person wearing it wants to detach it.

Another object is to achieve an attachment system of a simple and space-saving design.

Yet another object is to achieve an attachment system that allows the apparatus to turn up to 360° in the plane of the: holder, in which case the apparatus can easily and securely be worn in a holder attached to e.g. a belt.

To achieve the objects described above, the attachment system according to the invention is characterized by what is defined in the second part of the enclosed independent claims.

A preferred attachment system according to the invention comprises a holder attachable to a belt or the like and a separate connecting member fixed to the apparatus to be attached, such as a mobile phone.

In this case the actual holder preferably comprises
- a plate-like base which is to be fastened to e.g. a belt or the like support,
- a front plate connected to the base and partially covering the side of the base which is against the apparatus and which front plate is provided with a slot and
- a locking member which is stationarily disposed at the slot in the base to protrude from the base.

The connecting member attached to the apparatus in its turn comprises an annular connecting member mounted on a supporting pin and protruding axially outwards from the apparatus. The wall of the annular connecting member is provided with a gap or groove large enough for the locking part located in the holder to go through, allowing the locking member to radially be pushed in and out of the annular connecting member. The inner diameter (d) of the connecting member has to be large enough to allow it to axially turn around the locking part in the holder, preferably 360°. The outer diameter (D) of the annular connecting member in its turn has to be larger than the width (a) of the slot in the front plate of the holder in order to hold the connecting member in the holder, disposed at the slot between the base and the front plate.

The connecting member is preferably fastened to the back of the apparatus, but can also be fastened to the front part of the apparatus when desired, in which case naturally the use and the possible cover plate of the apparatus has to be considered in the design and the attachment system of the connecting member. The connecting member can e.g. be arranged to be turnable in the way that, while attached to the casing, it protrudes from the surface of the apparatus, but while used, can be turned out of the way, e.g. level with the surface of the apparatus. It is naturally also possible to have the connecting member pushed inside the casing of the apparatus when not needed.

According to a preferred embodiment of the invention, the front plate of the holder comprises two plate-like vertical parts and a plate-like bottom part which connects the vertical parts forming a broad U-shaped front plate. The front plate can be formed in one piece or combining several pieces when needed. This U-shaped front plate leaves an uncovered vertical slot in the plate-like base, which at its one end, i.e. the upper end, is open and at its other end, i.e. the bottom end, is at least partly closed. The slot is typically of equal width along its entire length and vertical, but can of course be designed in some other suitable way when desired.

The slot in the front plate of the holder allows the annular connecting member to move in the vertical direction of the slot in the locking housing formed between the front plate and the plate-like base. The annular connecting member or connecting part travels inside the locking housing and its supporting pin or neck, which has a smaller diameter than the annular connecting member, travels in the slot of the front plate. The slot in the front plate is narrow enough to prevent the annular connecting member, at least when the apparatus is not in use, from being pulled out perpendicularly from the locking housing.

The locking part disposed at the slot in the base of the holder is fixed to the base, preferably close to the closed end of the slot, in the way that it protrudes from the base almost up to the plane of the front plate, however, leaving between the locking part and the front plate a space large enough for the annular connecting member to be inserted there and locked to the locking part.

The locking part is preferably an oblong piece, with a maximal length equalling the length of the inner diameter of the annular connecting member, in order to allow the locking part to be inserted in the annular connecting member and the connecting member to be turned round the locking part.

The width of the locking part in its turn is slightly smaller than the width of the radial gap arranged in the wall of the annular connecting member in order to allow the locking part to be inserted, in its longitudinal direction, through the gap in the annular connecting member and pushed out of it. The gap arranged in the wall of the annular connecting member only allows the locking part to radially be pushed out from the annular connecting member when the connecting member and the locking part are in a certain position in relation to each other, the closed portion of the periphery of the annular connecting member preventing the locking part from coming out from the annular connecting member when these are in any other position in relation to each other. It is naturally possible, if desired, to arrange several gaps or slots in the wall of the annular connecting member, e.g. both at the 10 o'clock and the 2 o'clock positions, thus allowing the locking part to be pushed out from the annular connecting member in both these positions.

If desired, the attachment system can be arranged the other way round so that the plate-like base and the front plate disposed in it are fastened to the apparatus instead of to the holder. In this case the connecting member is disposed in the holder, in other words, the annular connecting member is fixed to the holder in the way that it protrudes axially outward from it.

A preferred embodiment according to the invention also comprises a protective cover or case for the apparatus. The case preferably comprises an oblong back-plate, in the first end, generally the upper end, of which a holder, e.g. for a mobile phone, according to the invention is disposed, and a protective plate, which is arranged to cover about e.g. 30–60% of the front side of the back-plate, generally the lower part of the back-plate.

The holder is disposed in the back-plate turnable round its axis. The holder can be fixed to the back-plate using various known methods which allow the holder to turn round an axis typically perpendicular to the back-plate. The holder is preferably disposed in an opening arranged in the back-plate, the periphery of which is designed so as to receive the holder and to lock it to the opening in the way that the holder can be turned 90°, preferably 360°, round an axis perpendicular to the back-plate.

The protective plate of the case is fixed to the back-plate at its edges so as to form a pocket. The pocket opens towards its upper part, i.e. towards the holder. In addition, one of the longitudinal sides of the back-plate of the pocket is at least partly open, allowing the apparatus attached to the holder to be inserted in the pocket formed between the back-plate and the protective plate by means of a swivel motion. When the case is turned in the horizontal position, the longitudinal, open side of the pocket forms the upper side of it. The protective front plate of the pocket can deviate from the rectangular form in the way that the height of the pocket from the base of the back-plate may vary so that the height of the pocket on one side is bigger than on the other. In this case, the completely or partly open side is preferably shorter than the other side, which, especially when the case is in the horizontal position, supports the apparatus placed in the pocket.

To prevent the mobile phone from swinging inside the pocket, a protrusion or the like may be arranged in the bottom of the pocket to support the telephone from its bottom or side. The protrusion can be provided with a spring arrangement for pressing the protrusion against the telephone.

In addition, fastening members are arranged in the case or protective cover to fasten it to a belt, wall rack, bag, dashboard of a car or the like. The fastening members for fixing the case to a belt typically comprise belt loops disposed both in the holder and the back-plate, on the back side of them, i.e. the side that is away from the protective front plate. The belt loop disposed on the back side of the holder is turnable, along with the holder itself, around the axis of the holder, preferably at least 90°, most preferably 360°, relative to the back-plate. By means of the two belt loops, the apparatus can also be fastened to the belt in the horizontal position or any other position deviating from the vertical position that feels more comfortable for the wearer than carrying an apparatus that dangles down from the belt.

The case according to the invention can, of course, be fixed at a desired place using conventional fixing members, such as screws, e.g. to the dashboard of a car.

In an arrangement according to the invention, a holder of the description above is preferably used. Another kind of holder attachable to the back-plate of the case and functioning in a corresponding way, i.e. allowing the back-plate and the holder to turn relative to each other, may be used.

The present system according to the invention is based on a design that does not allow the apparatus to be freely released from the holder at any position of the sector of 360° but only at one or, when desired, several, exactly defined positions. The release positions can be designed so as to make sure that the probability for the apparatus accidentally getting into a position corresponding to the release position is very little. Thus for example, instead of the 360° release sector known in snap-locking, the release range in arrangements according to the invention can be in a sector of no larger than 20°. Even a smaller release range, such as a sector of 5–15°, is possible. The use comfort can, however, be impaired if the release range is very limited. The release range can of course be larger, e.g. a sector of 30–60°, but then the risk for the apparatus to be detached accidentally increases. On the other hand, several smaller release positions, totalling a sector of 30–60°, can be preferred, depending on the case in question.

BRIEF DESCRIPTION OF THE DRAWINGS

FIG. 1 is a schematic frontal view of a holder as part of an attachment system according to the invention, disposed in a case for the apparatus;

FIG. 2 is a schematic partial rear view of a portable apparatus provided with an annular connecting member according to the invention;

FIG. 3 is a cross sectional view taken along the line AA of FIG. 2;

FIG. 9 is a view of the fastening member of FIG. 1 seen from behind;

FIG. 10 is a cross sectional view taken along the line DD of FIG. 1;

FIG. 11 is a frontal view of the apparatus of FIG. 1, fixed to a belt and turned into horizontal position;

DETAILED DESCRIPTION OF THE DRAWINGS

Figure 4:
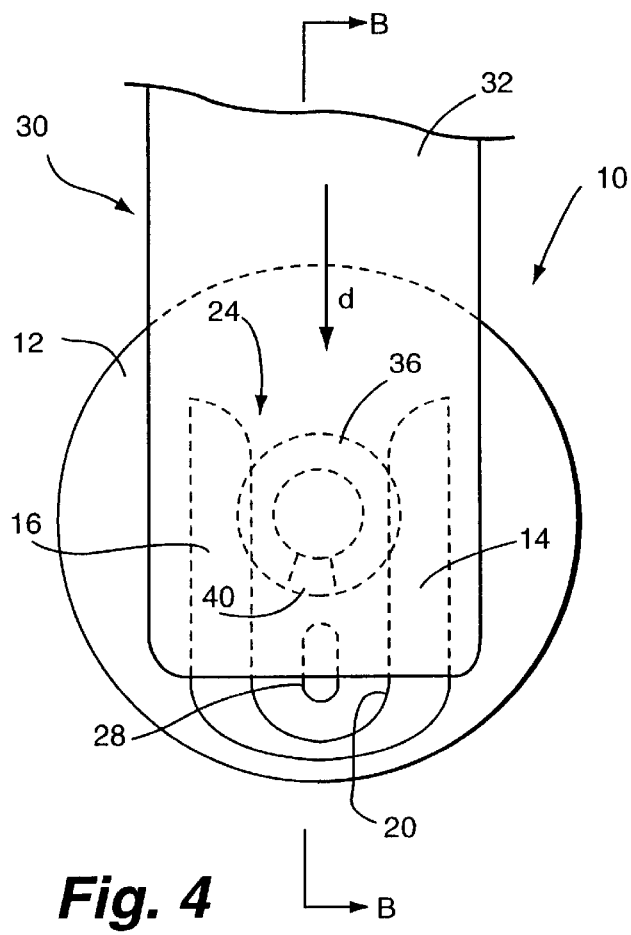
FIG. 4 shows schematically the first phase when attaching the apparatus provided with a connecting member according to FIG. 2 to a holder according to the invention, the apparatus and the holder seen from the front side.

FIG. 1 shows a means 1 which is part of an attachment system according to the invention applicable e.g. for attaching a mobile phone to a belt. The fastening means comprises a case 2, provided with a pocket 4, which is formed of a back-plate 6 and a protective front plate 8, and an actual holder 10 for the telephone. The back-plate is preferably designed according to the design of the mobile phone so that the parts of the mobile phone that are to be protected, e.g. the keyboard, fit in the pocket 4 which is formed between the back-plate and the protective plate.

The holder 10 is disposed in an opening in the back-plate and attached to it turnable round its axis. The holder comprises a plate-like base 12, which can be made of e.g. plastic or metal or other suitable material. The plate-like base is meant to be fixable to e.g. a belt or other garment, bag, rack on the wall or e.g. in a car, with the help of the members illustrated in FIGS. 9–14. The base of the holder does not have to be plate-like in the literal, limited meaning of the word, but it can also be of some other shape suitable for a base for a portable apparatus.

The base 12 of the holder is partly covered by a front plate 14, which can be made of the same material as the base, or some other suitable material. In the case illustrated by the figure, the front plate 14 is shaped like a broad letter U. The letter U is formed of two elongated, in this case vertical, parts 16, 16' and a lower part 18 which connects these two. A slot 20 is formed between the longitudinal parts 16, 16', the slot being closed in one end 22 and open in the other end 24. The width (a) of the slot illustrated in FIG. 1 is about ⅓ of the width (b) of the front plate 14. A locking housing 26 is formed between the base 12 and the front plate 14.

The shape of the front plate may of course be different from that shown in FIG. 1. The slot does not necessarily have to be straight, but can be shaped in any desired way. The front plate may also cover a considerably larger part of the plate-like base than one third of it, as shown in FIG. 1. The front plate can cover more than half, even nearly all of the base plate. Only a little slot is left open for fastening the connecting member of the apparatus to it.

A locking part 28 is stationarily disposed in the plate-like base at the slot 20. The locking part is typically a ridge-shaped oblong piece, the length of which is (l) and which is disposed so that its length direction is parallel with that of the slot. The part 28 is stationarily fastened to the base 12. The part 28 can be made of metal, plastic or some other relatively durable material. The height (h) of the locking part (see FIG. 5), i.e. its perpendicular dimension from the base 12, is about half the depth (H) of the locking housing 26 (see FIG. 5), or half the distance between the base and the front plate. If needed, the height (h) can be nearly the same as the depth (H) of the housing.

A partial view of the side of the mobile phone 30 which is against the holder, i.e. generally its back side, is shown in FIG. 2 as a partial view. FIG. 3 shows the same telephone as a cross sectional view taken along the line AA of FIG. 2. An annular connecting member 36, supported on a pin or neck 34, is fastened to the back-plate 32 of the mobile phone, by means of which connecting member the mobile phone can be attached to the holder 10. A gap or a slot 40 is formed at the 12 o'clock position in the upper part of the wall 38 of the annular connecting member, located perpendicularly outward from the back plate 32 of the apparatus, which gap, in the case shown in FIG. 2, forms a sector of about 20 degrees on the periphery of the connecting member. The purpose of the gap 40 is to make it possible to pass the ridge-shaped locking part 28 in the holder, when the telephone is being connected to the holder.

The diameter (d) of the inner periphery 42 of the annular connecting member 36 is slightly larger than the length (l) of the locking part so that the locking part can turn inside the annular connecting member. The outer diameter (D) of the annular connecting member 36 is larger than the width (a) of the slot 20, i.e. D>a, the edges of the vertical parts 16, 16' in the front plate of the holder preventing thus the annular connecting member from being pushed out from the locking housing.

Figure 5:
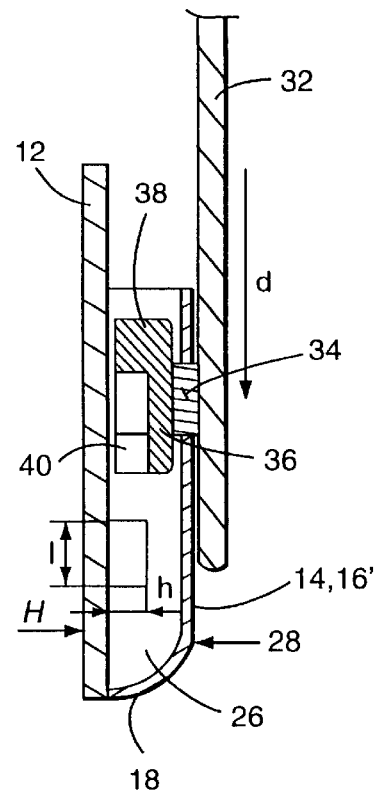
FIG. 5 is a cross sectional view taken along the line BB of FIG. 4.

FIGS. 4 and 5 illustrate the initial phase of attaching the mobile phone 30 to the holder 10. The mobile phone, seen from the front, is turned upside down so that the gap 40 in the annular connecting member 36 connected to the mobile phone points downward. From the point of view of the attaching of the mobile phone, the annular connecting member 36 is positioned so that it can be inserted in the locking housing 26 of the holder 10 from above downwards, the ridge-like locking part 28 thus being positioned inside the annular connecting member, in its middle, and passing the annular connecting member through the gap 40 in the upper part 38.

The annular connecting member 36 is disposed in the locking housing 26 of the holder through the open upper part 24 of the slot 20 and to run downward along the slot in the locking housing in the direction of the arrow α. The mobile phone is conducted along the slot all the way down, i.e. until the locking part 28 has completely gone inside the annular connecting member via the gap 40.

Figure 6:
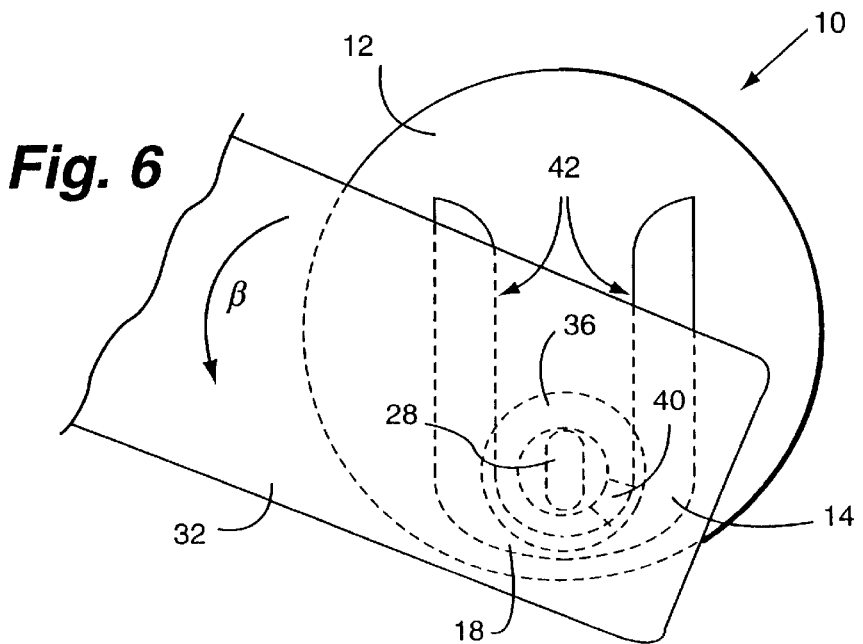
FIG. 6 shows the phase subsequent to that of FIG. 4, when the apparatus is being attached to the holder.

Hereafter the mobile phone 30 is turned 180 degrees anti-clockwise in the direction of arrow β, as shown in FIG. 6, the telephone turning axially in relation to the connecting member 36 and preferably also to the locking part 28.

Naturally, the mobile phone could correspondingly be turned clockwise.

Figure 7:
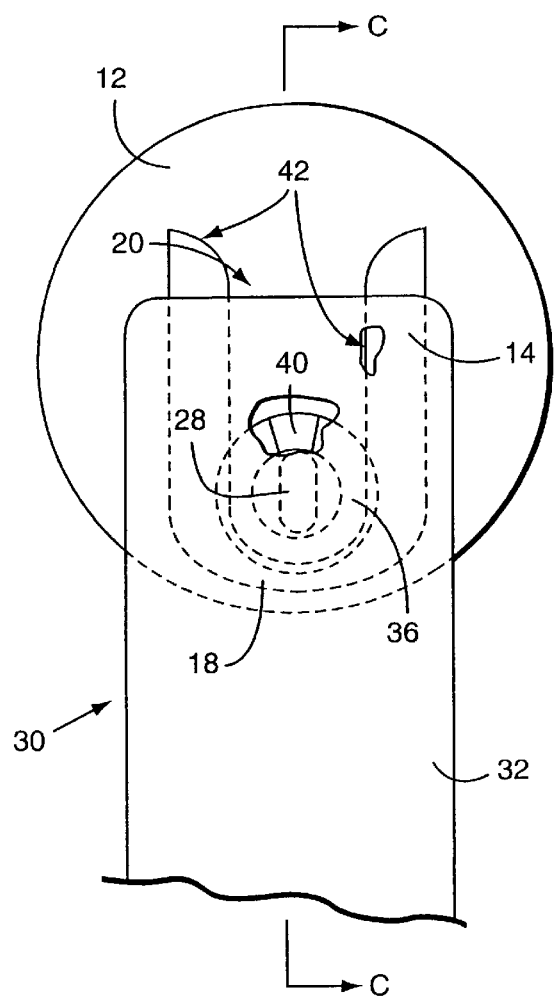
FIG. 7 shows the apparatus according to FIG. 2, when attached to a holder according to the invention.
Figure 8:
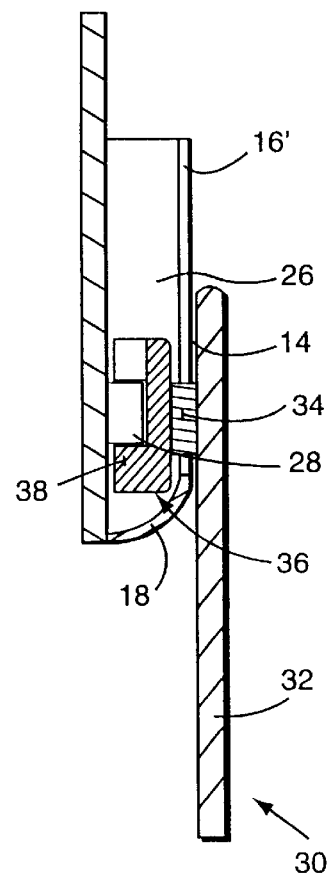
FIG. 8 is a cross sectional view taken along the line CC of FIG. 7.

FIGS. 7 and 8 illustrate the mobile phone 30 in the locked position fastened to the holder 10, in other words, when it has been turned 180 degrees, as shown in FIG. 6, in the plane of the holder into a freely hanging position. The edges 42 of the front plate prevent the annular connecting member 36 from being pulled perpendicularly outward from the locking housing. The lower part 18 of the front plate 14 prevents the annular connecting member, and thus the telephone 30, from falling down. The locking part 28 in its turn prevents the mobile phone from moving straight upwards. The locking part prevents the mobile phone from coming off the slot 20, even if the telephone would be turned 170 degrees clockwise or anti-clockwise while being lifted upwards. Only when the mobile phone has been turned 180 degrees, does the locking part allow the annular connecting member to move upwards in the slot and the telephone to become loose. The mobile phone can freely turn 360 degrees in the plane of the holder and is detachable from the holder only when turned into the vertical position. The risk of the telephone accidentally being detached from the holder has thus been minimized.

FIGS. 9 and 10 show a rear view and a cross sectional side view taken along the line DD of the apparatus of FIG. 1. A fastening loop 42 is disposed in the holder 10 on the back side of the base 12, by means of which the apparatus can be fastened to a belt. The belt is trodden through the loop in the horizontal plane. The holder 10 and the loop 42 therein are freely turnable in both directions round an axis perpendicular to the plane of the back-plate 6, in the direction of the arrow. Thus the case can be turned up to 360° round the holder. On the back side of the back-plate, in its lower part, there is another fastening loop 44, by means of which the case can be fastened to the belt in the horizontal position.

A protrusion 48 is arranged in the bottom 46 of the pocket 4, dimensioned so that it goes into a notch arranged in the bottom of the mobile phone, thus supporting the phone while it is in the pocket. The protrusion can be provided with a spring which presses the protrusion against the bottom of the phone and thus enhances its supporting effect.

FIG. 11 shows the back-plate 6 of the case or protection part when turned around the holder in the direction of the arrow, while the case is positioned horizontally. The holder 10 remains in its original position.

Figure 12:
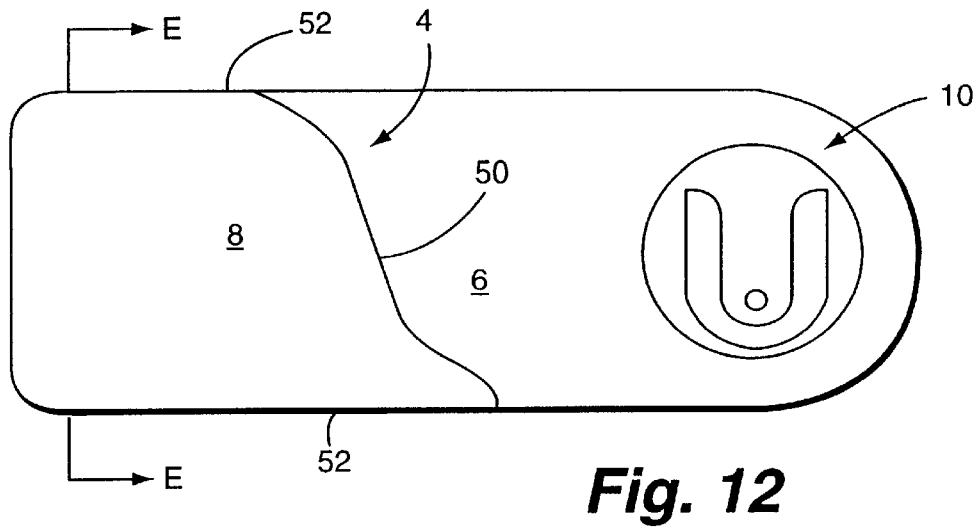
FIG. 12 shows the apparatus of FIG. 1 in the horizontal position, fixed at two points to e.g. a belt.
Figure 13:
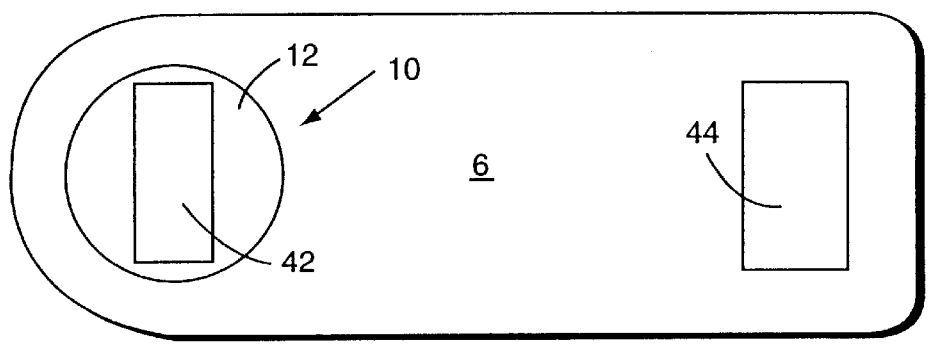
FIG. 13 is a rear view of the apparatus of FIG. 12.

FIGS. 12 and 13 show the case in the horizontal position. The telephone can be disposed on the holder 10 as shown in FIGS. 4 and 5, and thereafter turned into a horizontal position while inside the pocket 4. The side 50 of the pocket, which is against the holder, is open. In addition, the other side 52 of the pocket, which is parallel to the length direction of the back-plate and is the upper edge while the case is in the horizontal position, is open. Now the part which is outward from the holder of the telephone that has been attached to the holder 10 with the annular connecting member, can be turned round the holder to rest in the pocket supported by the other side 54.

Figure 14:
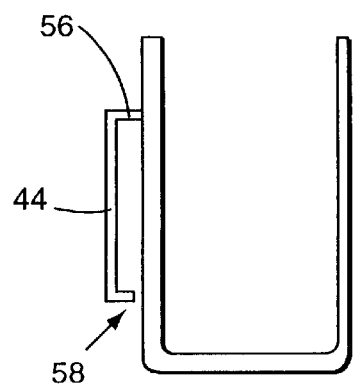
FIG. 14 is a cross sectional view taken along the line EE of FIG. 12.

While the case is in its horizontal position, both the fastening loops, 42 and 44, are in the vertical position so that the belt runs through the loops horizontally. As illustrated in FIG. 14, the loop 44 is attached to the back-plate 6 only by one of its sides 56, the opposite side 58 being open so that the loop can be trod behind the belt without the belt having to be opened.

Thus a better attachment system than the previous ones has been achieved with the attachment system according to the invention. The new system is reliable and holds the apparatus securely attached to the holder until the wearer wishes to detach it. The design needed is simple and space-saving. Further, it is easy and comfortable to use. The system allows the apparatus to be turned round in the plane of the holder generally at least 270°, depending on the form of the pocket, thus providing comfortable and secure ways of carrying the apparatus in various positions. Particularly, the system provides protection of the apparatus when carried in a horizontal position.

The invention can be modified in various ways and is not meant to be restricted to the embodiments presented above. The system according to the invention can e.g. be realized in the opposite way of the one shown in FIGS. 2–8, i.e. disposing the annular connecting member 36 in the holder and the ridge-shaped locking part 28 in the portable apparatus. The annular connecting member does not have to be shaped as a regular cylinder, but can e.g. be angular or have inclined walls. The invention is meant to be broadly applicable within the scope of the appended claims.

What is claimed is:

1. An attachment system for temporarily attaching an apparatus to a holder, said system comprising:

said holder comprising a base and a front plate spaced from said base in a first distance in a first direction, said front plate having a slot formed therein having a width, substantially perpendicular to said first direction;

a locking part extending outwardly from said base toward said front plate, and aligned with said slot, said locking part having a width and a length and a thickness, said thickness less than said first distance;

an apparatus comprising a support, a supporting member protruding outwardly from said support, and an annular connecting member connected to said supporting member, said supporting member having a width;

said annular connecting member comprising an annular wall having an outer diameter, and an inner diameter, and comprising an opening within said inner diameter;

said wall having a gap formed therein having a width; and wherein said holder and said apparatus are constructed and dimensioned so that said gap width is greater than said locking part width, said locking part length is less than said inner diameter, said supporting member width is less than said slot width and less than said outer diameter, and said outer diameter is greater than said slot width, so that said annular connecting member is movable from an unlocked position to between said base and said front plate with said supporting member within said slot and with said locking part aligned with and passing through said gap until said locking part is within said opening within said inner diameter, and then said support is rotatable with respect to said base about an axis substantially aligned with said supporting member to a position in which said apparatus will be locked to said holder unless rotated to said unlocked position.

2. An attachment system as recited in claim 1 wherein said front plate comprises first and second vertical parts, and a lower part connecting said vertical parts, to define said slot, so that said slot has an open end opposite said lower part, and a closed end at said lower part.

3. An attachment system as recited in claim 1 wherein said locking part length is approximately the same dimension as said annular connecting member inner diameter.

4. An attachment system as recited in claim 1 wherein said support is rotatable approximately 360° with respect to said base about said axis.

5. An attachment system as recited in claim 2 wherein said gap width is approximately the same as said locking part width, and said gap has an arcuate extent of about 5–20°.

6. An attachment system as recited in claim 5 wherein said apparatus comprises a mobile phone, and said support comprises a back plate of said mobile phone.

7. An attachment system as recited in claim 2 wherein said supporting member comprises a supporting pin.

8. An attachment system as recited in claim 1 wherein said holder base comprises fastening members for fastening said holder to a belt, wall bracket, or bag.

9. An attachment system as recited in claim 1 wherein said holder comprises a back plate containing said base, and wherein said holder further comprises a front protecting plate defining with said back plate a protecting pocket dimensioned for receipt of said apparatus; and fastening members for connecting said pocket to another structure so that said slot is substantially vertical and is vertically above said front protecting plate.

10. An attachment system as recited in claim 9 wherein said fastening members connected to said back plate connect said holder to a belt or the dashboard of a car.

11. An attachment system as recited in claim 2 wherein said holder comprises a back plate containing said base, and wherein said holder further comprises a front protecting plate defining with said back plate a protecting pocket dimensioned for receipt of said apparatus; and fastening members for connecting said pocket to another structure so that said slot is substantially vertical with said open end of said slot above said closed end thereof, and said slot is vertically above said front protecting plate.

12. An attachment system as recited in claim 11 wherein said fastening members connected to said back plate connect said holder to a belt or the dashboard of a car.

13. An attachment system as recited in claim 9 wherein said back plate and said front protecting plate are connected to each other so that there is a side opening in said pocket formed therebetween which allows rotation of said apparatus about said axis into or out of said pocket.

14. An attachment system as recited in claim 9 wherein said front end and said locking part are rotatable with respect to said back plate about 360° about an axis substantially parallel to said locking part.

15. An attachment system as recited in claim 10 wherein said fastening members comprise belt loops connected to said holder on the opposite said thereof as said front protecting plate.

16. An attachment system as recited in claim 10 wherein said fastening members comprise belt loops attached to said base on the opposite side thereof from said front plate and are rotated at least 90° about an axis substantially parallel to said locking part.

17. An attachment system as recited in claim 9 further comprising a protrusion protruding into said pocket and supporting said apparatus when said apparatus is within said pocket.

18. An attachment system as recited in claim 10 wherein said fastening members comprise members for fastening said back plate to the dashboard of a car.

\* \* \* \* \*